United States Patent [19]

LaFreniere

[11] Patent Number: 4,874,523
[45] Date of Patent: Oct. 17, 1989

[54] METHOD FOR REDUCING THE CLOUD POINT OF MATERIALS USING AN ULTRAFILTRATION SEPARATION PROCESS

[75] Inventor: Lucie Y. LaFreniere, Brights Cove, Canada

[73] Assignee: Exxon Research and Engineering Company, Florham Park, N.J.

[21] Appl. No.: 231,332

[22] Filed: Aug. 12, 1988

[51] Int. Cl.$^4$ .................................................. B01D 13/00
[52] U.S. Cl. ........................................ 210/651; 208/31; 208/308; 208/321; 210/652; 585/819
[58] Field of Search ............... 585/819, 818; 208/31, 208/308, 321; 210/634, 637, 644, 648, 649, 650, 651, 652

[56] References Cited

U.S. PATENT DOCUMENTS

| | | | |
|---|---|---|---|
| 3,223,624 | 12/1965 | Paulson | 208/24 |
| 4,129,583 | 12/1978 | Zondek | 260/428.5 |
| 4,496,456 | 1/1985 | Hafez et al. | 208/33 |
| 4,532,041 | 7/1985 | Shuey et al. | 210/500.39 |
| 4,541,972 | 9/1985 | Wernick | 264/41 |
| 4,678,555 | 7/1987 | Wernick | 208/36 |

FOREIGN PATENT DOCUMENTS

| | | |
|---|---|---|
| 146298 | 6/1985 | European Pat. Off. . |
| 154746 | 9/1985 | European Pat. Off. . |

OTHER PUBLICATIONS

"New Separation Technique for the CPI", Michaels, Chemical Engineering Progress, vol. 64, No. 12, pp. 31–42 (1968).
"Membranes for Pressure Permeation", Friedlander et al., Membrane Processes in Industry and Biomedicine, Brier (ed), Plenum Press, New York–London, pp. 73–99 (1971).

Primary Examiner—Frank Sever
Attorney, Agent, or Firm—Joseph J. Allocca

[57] ABSTRACT

A method is disclosed for reducing the cloud point of materials comprising the steps of chilling the waxy oil so as to achieve submicron crystallization followed by ultrafiltration thereby effecting separation of a permeate of reduced cloud point from a retentate. Chilling to produce submicron crystallization is to a temperature about 3° C. or less above the cloud point of the material, preferably from 0.5° to 2° C. above the cloud point of the material, most preferably between 1° to 2° C. above the cloud point of the material. In general any mixture, solution or melt containing components which crystallize at different temperatures can be separated by this procedure. The method is especially useful for reducing the cloud point of waxy hydrocarbon oils. The ultrafiltration membrane used will be one which is inert in and non-reactive with the components of the solution, mixture or melt, will not melt at the temperatures employed, which possesses an effective pore size smaller than the submicron crystals formed upon chilling and which does not have a strong chemical affinity for the crystallized component of the feed mixture, solution or melt.

9 Claims, 4 Drawing Sheets

METHOD FOR REDUCING THE CLOUD POINT OF MATERIALS USING AN ULTRAFILTRATION SEPARATION PROCESS

BACKGROUND OF THE INVENTION

The separation of a mixture into its components ha been performed by any number of techniques in the past. Such separation techniques include distillation, extraction, chilling/filtration, and more recently, reverse osmosis through a membrane which in general depends upon molecular type differences between components in a stream, perstraction and pervaporation which rely upon differences in molecular type and solubility in the membrane, and ultrafiltration which, in general, relies upon size differences to effect separation.

Distillation is typically employed when the boiling points of the components in the solution, mixture or melt are sufficiently different so that a relatively clean separation of the components can be achieved. Materials of different molecular type but similar boiling point are not readily separable by distillation.

Extraction effects the separation of components in a mixture by utilizing the differences in solubility of the components in some added, easily separated/recovered solvent. For example, aromatic hydrocarbons are separated from generally similar boiling point aliphatic hydrocarbon by taking advantage of the higher solubility of aromatics in an extraction solvent such as phenol, furfural or NMP. The extraction solvent selective separtes the aromatics from the mixture; the aromatics themselves are easily separated from the extraction solvent.

Crystallization from a solution or melt followed by filtration is a well established separation technique. It has found application in oil dewaxing. In general, the oil to be dewaxed with or without added dilution solvent is chilled to a temperature at which the wax crystallizes producing a wax/oil slurry. This slurry is subsequently filtered to yield a dewaxed oil. Thus, large wax crystal size is desirable for efficient filtration. This chilling is usually to a temperature well below the desired pour point of the oil and is called the filter temperature. Thus, to achieve a pour point of about $-15°$ C., one would have to chill the oil to a temperature lower than $-15°$ C.

Reverse osmosis separates components by molecular type and employs applied pressure to overcome the osmotic pressure and selectively permeate one component through a non-porous membrane. Perstraction and pervaporation separate components on the bases of molecular type and rely upon the selective dissolution of one component in the membrane and migration of the component across the membrane in response to a concentration gradient. Ultrafiltration separates molecules on the basis of difference in molecule particle size.

In the present invention it has been discovered that in effecting an ultrafiltration separation of components of different melting/solidification point temperature it is not necessary, and in fact, is detrimental to ultrafilterability to cool the mixture to a temperature at or below the phase transition temperature of the higher melting component to be separated. The phase transition temperature, for the purposes of this application and the appended claims, is defined as the temperature at which macroscopic crystals are formed, and operating temperature is that at which the component to be removed is just in the crystallite or submicro crystal form. Thus, operation must be at just above the phase transition temperature.

DESCRIPTION OF THE PRESENT INVENTION

Figure 1:
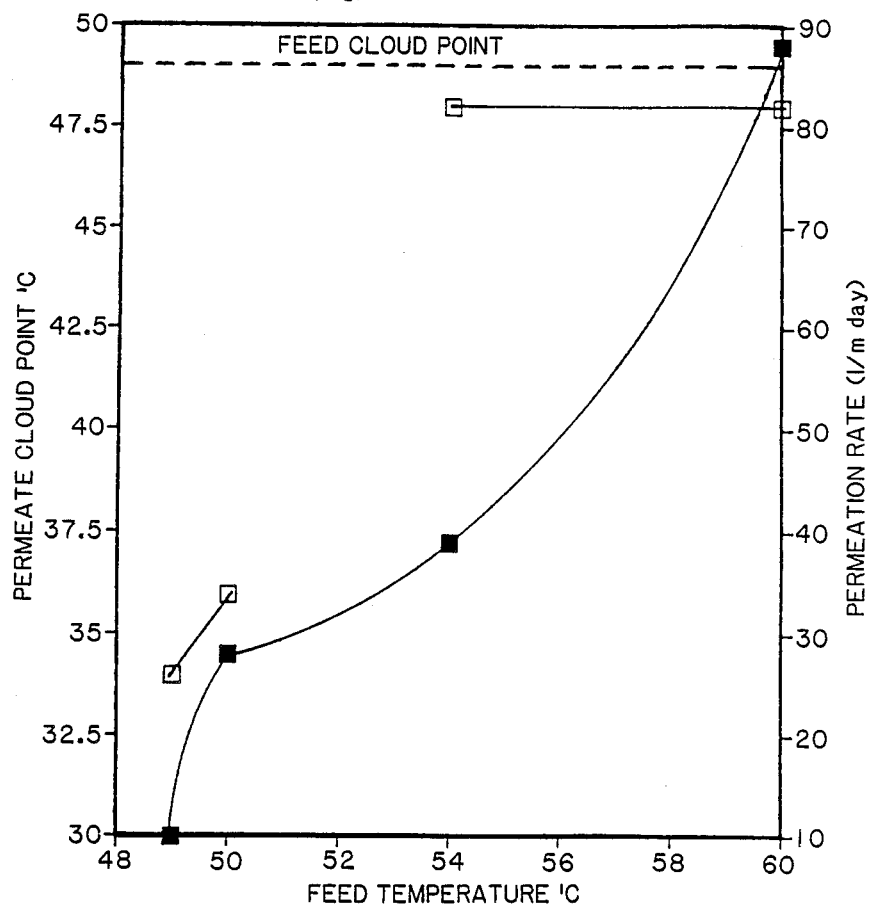
FIG. 1 presents the interrelationship which exists between permeation rate, permeate cloud point and feed cloud point as a function of feed temperature.

Mixtures, solutions or melts containing components which crystallize at different temperatures can be separated by chilling said solution, mixture or melt to a temperature about 3° C. or less above the liquid/solid phase transition temperature of the higher melting component, preferably between 0.5° C. to 2° C. above the phase transition temperature, most preferably between 1° C. to 2° C. above the phase transition temperature, and ultrafiltering the resulting chilled mixture, solution or melt and recovering a permeate containing less of the higher melting component than the feed and a retentate enriched in the higher melting component in comparison to the feed. The exact temperature or temperature range within the above recited elements would depend on the particular feed mixture solution or melt and on the pore size of the membrane used relative to the crystallite size. The phase transition temperature of the higher melting point component corresponds to the cloud point of the feed mixture, solution or melt. Ultrafiltration is conducted at a pressure between 25 and 150 psig, preferably 25 to 100 psig, most preferably 50 to 75 psig. The ultrafiltration membrane has a pore size in the range $0.001\mu m$ to $0.5\mu m$, preferably 0.001 to $0.1\mu m$, most preferably 0.005 to 0.1 $\mu m$.

In particular, waxy hydrocarbon oils can be dehazed by chilling the waxy oil to a temperature of about 3° C. or less above the haze point, preferably between 0.5 ° C. to 2 ° C. above the haze point, most preferably 1 ° C. to 2° C. above the haze point to achieve submicron crystallization yielding particles on the order of 0.001 to $0.1\mu m$ in size and ultrafiltering the chilled oil to produce an oil permeate of reduced cloud point resulting from the removal of higher melting point wax. The oil permeate produced by the process of the present invention has been discovered to possess a haze point 10° C. to 15° C. lower than the haze point of the original waxy oil feed. Chilling to a temperature more than about 3° C. above the haze point produces a permeate having a haze point only about 1° C. lower than that of the original waxy oil feed while chilling to a temperature at or below the haze point produces a wax/oil slurry which fouls the membrane and reduces the permeation rate.

Ultrafiltration is performed using a membrane of adequate pore size to permit free passage of the uncrystallized component while retarding passage of the crystallized component. Ultrafiltration membranes are typically described as those membranes possessing pore size in the 0.001 to 0.5 $\mu m$ range, preferably in the 0.001 to 0.1 $\mu m$ range. The membrane should also be inert/non-reactive with the components of the solution, mixture or melt, should not itself melt or disintegrate at the temperature to which it is exposed and at which it is employed. To avoid fouling, the membrane should not have a strong chemical affinity for the crystallized components of the mixture solution or melt.

In the process of the present invention, it is preferred that the chilling of the feed be conducted under conditions which produce crystals which are spherical in shape. Crystals of such spherical morphology are less susceptible to fouling and are more easily rejected. Better overall membrane performance will be the result. Thus, when the process of the present invention is practiced on waxy hydrocarbons, the chilling to a temperature of 3° C. or less above the cloud point is preferably performed under conditions of the DILCHILL process. The DILCHILL process and its various variations are described in detail in U.S. Pat. Nos. 3,775,288, 3,773,650, 3,850,740.

In general terms, in the DILCHILL dewaxing process, the waxy hydrocarbon, with or without the addition of a quantity of predilution solvent, is introduced into a multi-stage chilling zone. Chilled dewaxing solvent is introduced into a plurality or all of the stages in the multi-stage chilling zone. In each stage in which cold solvent is introduced a condition of intense agitation is maintained so that substantially instantaneous mixing occurs at each point of solvent introduction. The wax crystals produced under these conditions are spherical in nature.

The chilling of the waxy hydrocarbon under the above described conditions of intense agitation can be to the temperature necessary to practice the present invention. Alternatively, dewaxing can be practiced first using any of the dewaxing procedures which exist, including the aforementioned DILCHILL process, after which the dewaxed product can be dehazed by being subjected to high agitation chilling to a temperature 3° C. or less above the dewaxed feed cloud point followed by ultrafiltration, to remove higher melting point wax and thereby further reduce the cloud point.

In any of these embodiments, if the temperature to which the feed is chilled t achieve a feed temperature 3° C. or less above the feed cloud point is high enough so that the feed viscosity is low enough, it may be possible to eliminate addition of dilution solvent in the dehazing process.

When dealing with naphthenic oil which inherently possess low pour points, the major cause for product quality concern is haze. Because of the very fine nature of the wax crystals constituting haze in such oils, dehazing typically involves the deliberate addition to the oil of a significant quantity of wax so as to facilitate removal of the wax contributing to haze. By practice of the present invention, dehazing can be achieved much more simply and economically.

The present invention is illustrated by the following non-limiting examples.

EXPERIMENTAL

Example 1

A waxy 600N raffinate having a cloud point of 49° C. was used as the feed. An ultrafiltration membrane of polysulfone having a pore size of 0.07μm was used. The oil was chilled, without solvent dilution and without use of DILCHILL type chilling in the following manner. The pressure employed was 150 psig. Cloud points of the feed samples and recovered permeates were determined. The results are present in Table 1.

The feed was first heated to 60° C. and circulated through the ultrafiltration cell across the surface of the ultrafiltration membrane. During this circulation the feed temperature was controlled by regulating the heat from heating tapes on the cell unit.

TABLE 1

ULTRAFILTRATION RESULTS ON LUBES DEWAXING

Feed: 600 N raffinate, cloud point = 49° C.
Membrane: Polysulfone (0.07 μm)
Pressure: 150 psig

| Run No. | Feed Temperature °C. | Permeation Rate L/m² Day | Permeate Cloud Point °C. |
|---|---|---|---|
| 1 | 50 | 28 | 36 |
| 2 | 49 | 10 | 34 |
| 3 | 51 | 9 | 35 |
| 4 | 60 | 88 | 48 |
| 5 | 54 | 39 | 48 |

Notes:
Runs 1, 2 and 3 were performed on the same day, runs 4 and 5 were performed the following day.
Run no. 3, because it was performed after two other experiments conducted at lower temperatures, is not considered demonstrative. The membrane could have been fouled which would account for the low permeation rate.

The permeation rate and cloud point data were plotted as a function of the feed temperature in FIG. 1. Results from run no. 3 (Table 1) at 51° C. are not shown because this run was preceded by two others at lower temperatures which fouled the membrane. FIG. 1 indicates that, at feed temperatures 54° C. and above, the permeate cloud point was constant and only 1° C. lower than the feed; at 50° C. and below, the cloud point difference was greater than 13° C. Thus, at 54° C. the wax crystals were either not yet formed or still too small to be rejected Further, there exists a transition temperature between 50° C. and 54° C. where the wax crystals reach the size required to be rejected by the membrane.

There was a decrease in permeation rate with decrease in feed temperature, as expected from the increase in viscosity. However, the permeation rate decrease in the vicinity of 50° C. was accelerated which reflected the formation/growth of the wax crystals in this temperature range. The plot of FIG. 1 can be used to determine the best operating point Due to the low permeation rate and high fouling potential at 49° C., the cloud point, the best overall membrane performance would be at a temperature above the cloud point, preferably in the vicinity of 50° C. At this temperature compared to 49° C. the permeate cloud point is only 1° C. higher while the permeation rate is almost three times greater. Also, the smaller wax crystals at 50° C. are less susceptible to membrane fouling.

Example 2

Additional runs were conducted using the 600N oil raffinate of Example 1 but employing different membranes. Teflon, polysulfone, sulfonated polysulfone, polyimide, cellulose acetate and polycarbonate membranes were evaluated for use in the present process. A pressure of 150 psig was employed as was a circulation rate of 1 gallon per minute. The feed was cooled to approximately 1° C. above the feed cloud point using the technique described in Example 1. The results are presented in Table 2.

TABLE 2
ULTRAFILTRATION PERFORMANCE OF MEMBRANES WITH 600 N OIL

Feed: 600 N Singapore Raffinate, Cloud Point = 51° C.
Conditions: 150 psig, 1 GPM
Temperature = approx. 1° C.
above feed cloud point

| Membrane | | | Ultrafiltration Performance | |
|---|---|---|---|---|
| Polymer[1] | Pore Size[2] | Supplier/Trade Name | Δ Cloud Point °C. | Permeation Rate L/m²/day |
| Teflon | 0.02 μm | Gore/Goretex | 6.6 | 135 |
| Teflon | 100K MWCO | DSI/K-100 | 3.8 | 370 |
| Polysulfone | 0.07 μm | DSI | 9.0 | 20 |
| Polysulfone | 97.4% NaCl passage | Osmonics/Sepa-O-PS | 3.0 | 12 |
| Sulfonated Polysulfone | — | DSI/D-SPS | negligible | 1 |
| Polyimide | — | DSI/UX302-AO | 4.4 | 48 |
| Cellulose Acetate | 20K MWCO | Osmonics/Sepa-20-UF | 3.2 | 20 |
| Polycarbonate | 0.01 μm | Nuclepore | 2.6 | 6 |

Definition: Δ Cloud Point = (Cloud Point)$_{Feed}$- (Cloud Point)$_{Permeate}$
[1] All polymers are hydrophilic except Teflon which is hydrophobic
[2] The molecular weight cut-off (MWCO) of the membrane and similarly the NaCl passage are qualitative measures of pore size used by membrane suppliers.

Example 3

The effect of temperature control on the cloud point reduction of Bright Stock Oil using ultrafiltration was investigated for three membrane samples, two Teflon samples and a polysulfone sample. The feed was cooled to approximately 1° C. above the feed cloud point again using the technique described in Example 1. The results of this experiment are presented in Table 3.

TABLE 3
ULTRAFILTRATION PERFORMANCE OF MEMBRANES WITH BRIGHT STOCK OIL

Feed: Bright Stock Raffinate Oil, Cloud Point = 63° C.
Conditions: 100 psig, 1 GPM,
Temperature = approx. 1° C.
above feed cloud point

| Membrane | | | Ultrafiltration Performance | |
|---|---|---|---|---|
| Polymer | Pore Size | Supplier/Trade Name | Δ Cloud Point | Permeation Rate L/m²/day |
| Teflon | 0.02 μm | Gore/Goretex | 7.4 | 16 |
| Teflon | 100K MWCO | DSI/K-100 | 7.2 | 22 |
| *Polysulfone | 0.07 μm | DSI | 8.8 | 13 |

*This test was at 150 psig.

Example 4 This Example is presented to illustrate the differences in performance which were obtained between different samples of the same materials obtained from the same suppliers. In this case a 600N raffinate with a cloud point of 51° C. was used as feed. The performance of 3 samples of 2 different membranes was tabulated and averaged. The results are presented in Table 4.

TABLE 4
VARIATION IN MEMBRANE PERFORMANCE OBSERVED IN LABORATORY SCALE TESTING

Feed: 600 N Singapore Raffinate, Cloud Point = 51° C.
Conditions: 150 psig, 1 GPM,
Temperature = approx. 1° C.
above feed cloud point

| Sample No. | Δ Cloud Point °C. | Permeation Rate L/m²/day |
|---|---|---|
| Membrane: Polysulfone, 0.07 μm, DSI | | |
| 1 | 13 | 28 |
| 2 | 9 | 20 |
| 3 | 9.8 | 88 |
| Average | 10.6 ± 1.5 | 45 ± 26 |
| Membrane: Teflon, 0.02 μm, Gore/Goretex | | |
| 1 | 6.6 | 135 |
| 2 | 4.8 | 239 |
| 3 | 5.2 | 358 |
| Average | 5.5 ± 0.7 | 244 ± 79 |

Example 5

The effect of diluting the oil with solvent to produce a feed to the ultrafiltration process is as investigated.

A volume of Bright Stock oil diluted with an equal volume of MIBK solvent was used as feed. The actual oil/solvent ratio of the feed in the ultrafiltration experiment could have been slightly different, however, due to evaporation during the preliminary steps. The cloud point of the feed mixture was measured as 59.8° C., compared to 63° C. for the Bright Stock oil.

Figure 2:
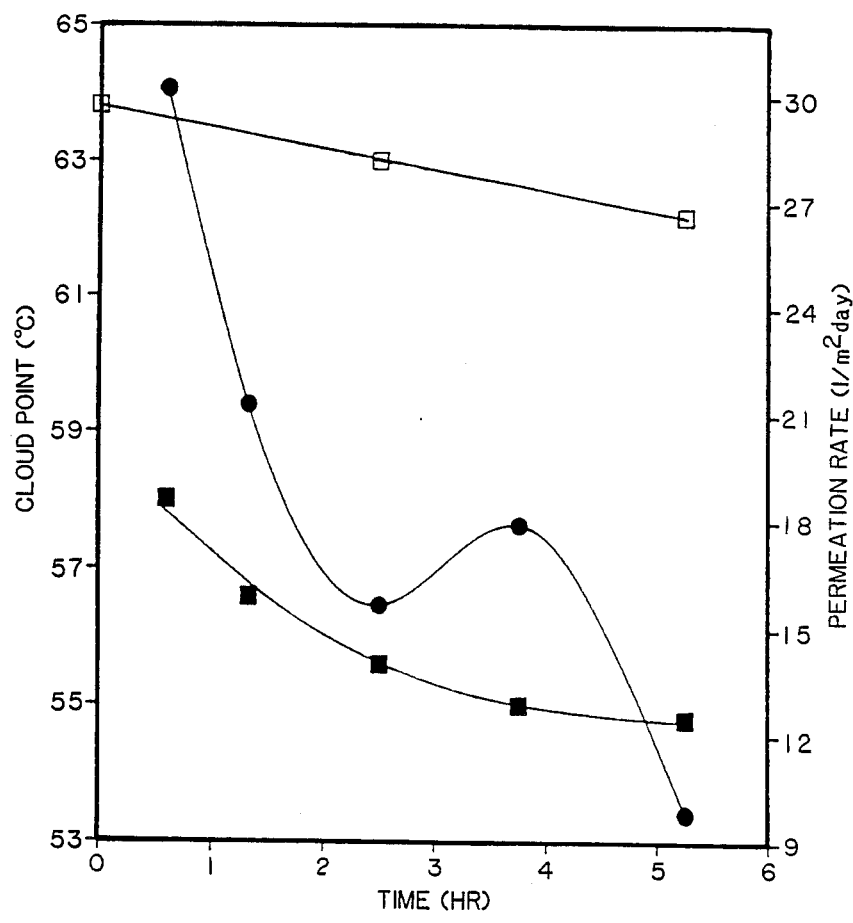
FIG. 2 presents the effect of time on stream on the ultrafiltration of Bright Stock (Cloud Point=63° C.).

A Teflon DSI/K-100 membrane was used for the ultrafiltration experiment at the feed conditions: approximately 1° C. above the feed mixture cloud point, 50 psig and 1 GPM. The retentate and permeate samples were stripped from the solvent to measure the oil cloud point. A 4.4° C. cloud point reduction was observed with the permeate. On an oil basis, the permeation rate was 25 L/m²/day. Comparing with solvent dilution to without solvent dilution (Table 2) the cloud point reduction is less and the permeation rate of oil slightly higher. However, considering the application and membrane performance variation illustrated in Example 4 coupled with some differences in test conditions (i.e., a lower operating pressure), these differences in membrane performance are not significant. Example 6 Effect of Time and Pressure on Ultrafiltration of Oil Runs were conducted to determine the effect of time and pressure on the ultrafiltration of oil. The membranes used were samples of Teflon, 0.02m from Gore/-Goretex. In Run A a Bright Stock oil having a cloud point of 63° C. was permeated through the membrane at 100 psig, 1 GPM and 1° C. above the cloud point for a period of about 5 hours. Permeate cloud point, retentate cloud point and permeation rates were determined at intervals during the run. The results are presented in FIG. 2. It is seen that over time the permeation rate steeply decreases. Permeate cloud point exhibited continuous improvement i.e. increased decrease) over time but appeared to be reaching a steady, bottomed out level. Retentate cloud point also appeared to decrease but this was attributed to the loss of wax to the unit walls. It is apparent that in unit operation periodic cleaning treatments like back washing or back pulsing may be needed to recover permeation rate.

Figure 3:
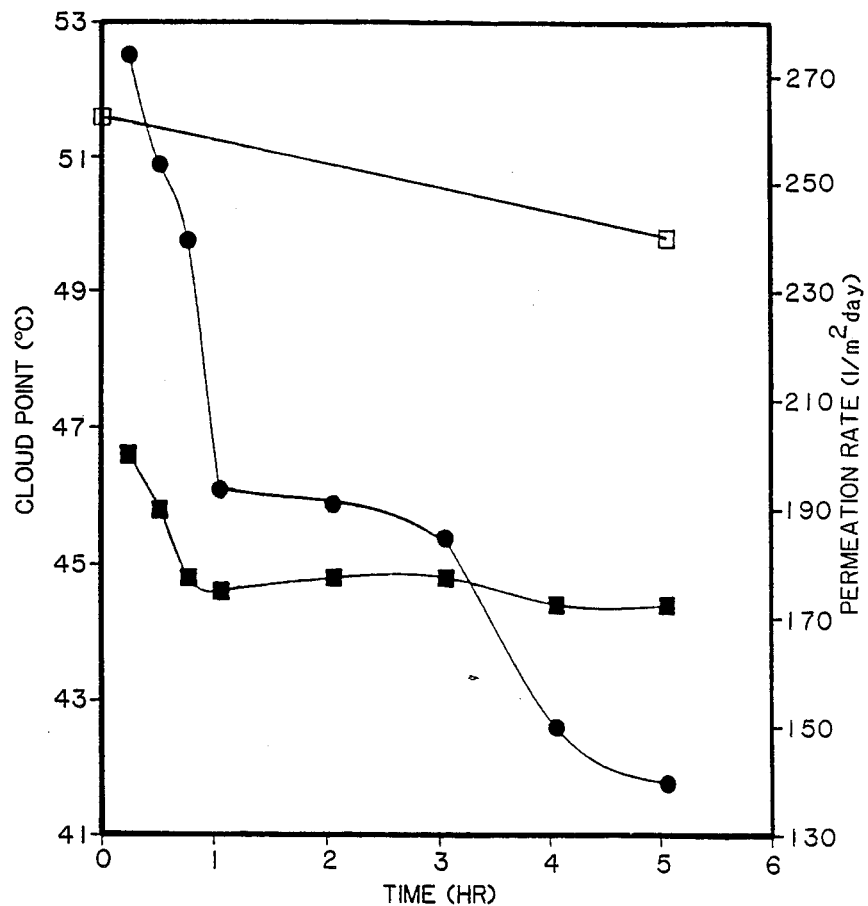
FIG. 3 presents the effect of time on stream on the ultrafiltration of a 600N oil (Cloud Point=51° C.).

Similar results were obtained when a run was conducted using 600N oil (Cloud Point - 51° C.) as the feed. The results are presented in FIG. 3. Permeation rate falls off dramatically. Permeate cloud point experiences a slight improvement over time but quickly reaches a bottomed out level.

Figure 4:
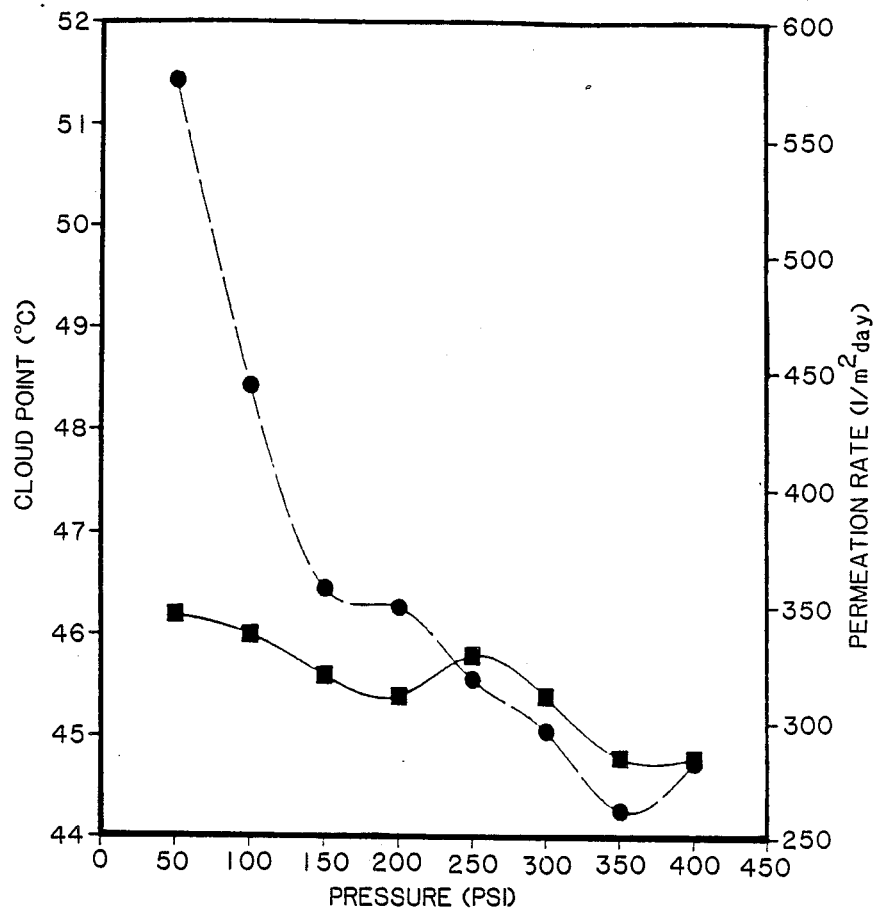
FIG. 4 presents the effect of pressure on the ultrafiltration of a 600N oil (Cloud Point=51° C.).

The effect of pressure on the ultrafiltration dewaxing of an oil was also investigated using a 600N oil (Cloud Point=51° C.) as feed. Increasing the process pressure resulted in a decrease in permeation rate with no significant improvement in permeate cloud point. The results are plotted in FIG. 4. From this it is clear that the process of the present invention is preferably conducted at low pressure.

I claim:

1. A method comprising: separating the components of mixtures, solutions or melts containing said components which crystallize at different temperatures by chilling said mixture, solution or melt to a temperature about 3° C. or less but above the liquid/solid phase transition temperature of the higher melting component to produce crystallites or submicro crystals of said higher melting component in the mixture, solution or melt and ultrafiltering the resulting chilled mixture, solution or melt to recover a permeate containing less of the higher melting component than the feed and a retentate enriched in the higher melting component in comparison to the feed.

2. The method of claim 1 wherein the mixture, solution or melt is chilled to a temperature between 0.5° C. to 2° C. above the phase transition temperature of the higher melting component in the mixture, solution or melt.

3. The method of claim 2 wherein the mixture, solution or melt is chilled to a temperature between 1° C. to 2° C. above the phase transition temperature of the higher melting component in the mixture, solution or melt.

4. The method of claim 1 wherein the mixture, solution or melt is a waxy hydrocarbon oil.

5. The method of claim 1 wherein the ultrafiltering is conducted at a pressure between 25 and 150 psig.

6. A method comprising: reducing the cloud point of a waxy hydrocarbon oil by chilling said waxy hydrocarbon oil to a temperature about 3° C. or less but above the cloud point of the waxy oil to produce crystallites or submicro crystals of the higher melting wax in said waxy oil and ultrafiltering the resulting chilled waxy oil to recover a permeate containing less of the higher melting wax and a retentate enriched in the higher melting wax, wherein the permeate has a cloud point lower than the cloud point of the original waxy oil feed.

7. The method of claim 6 wherein the waxy oil is chilled to a temperature between 0.5° C. to 2° C. above the cloud point of the waxy oil.

8. The method of claim 6 wherein the waxy oil is chilled to a temperature between 1° C. to 2° C. above the cloud point of the waxy oil.

9. The method of claim 6 wherein the ultrafiltering is conducted at a pressure between 25 to 100 PSIG.

* * * * *